United States Patent [19]

Johnson

[11] 4,050,179

[45] Sept. 27, 1977

[54] ROD BUTT WITH INTEGRAL REEL SEAT

[76] Inventor: Frank W. Johnson, 2411 NE. 31st Ct., Lighthouse Point, Fla. 33064

[21] Appl. No.: 672,233

[22] Filed: Mar. 31, 1976

[51] Int. Cl.² .............................................. A01K 87/06
[52] U.S. Cl. ........................................................ 43/22
[58] Field of Search ........................................... 43/22

[56] References Cited

U.S. PATENT DOCUMENTS

| 1,035,936 | 8/1912 | Anderson | 43/22 |
| 2,456,681 | 12/1948 | Culver | 43/22 |
| 2,485,144 | 10/1949 | Espenship | 43/22 |

Primary Examiner—Louis G. Mancene
Assistant Examiner—Daniel J. Leach
Attorney, Agent, or Firm—Daniel M. Rosen

[57] ABSTRACT

An integrated rod butt with rod handle and reel seat is constructed to be interchangeable with various tips by means of a ferrule for mounting the tips to the rod butt. The ferrule includes a locator cooperating with a rod butt locator for precise alignment, and provides gasket sealing of the ferrule to the rod butt. The sealing permits the use of the same lightweight aircraft alloy to be used for all components, including rod butt and ferrule.

8 Claims, 3 Drawing Figures

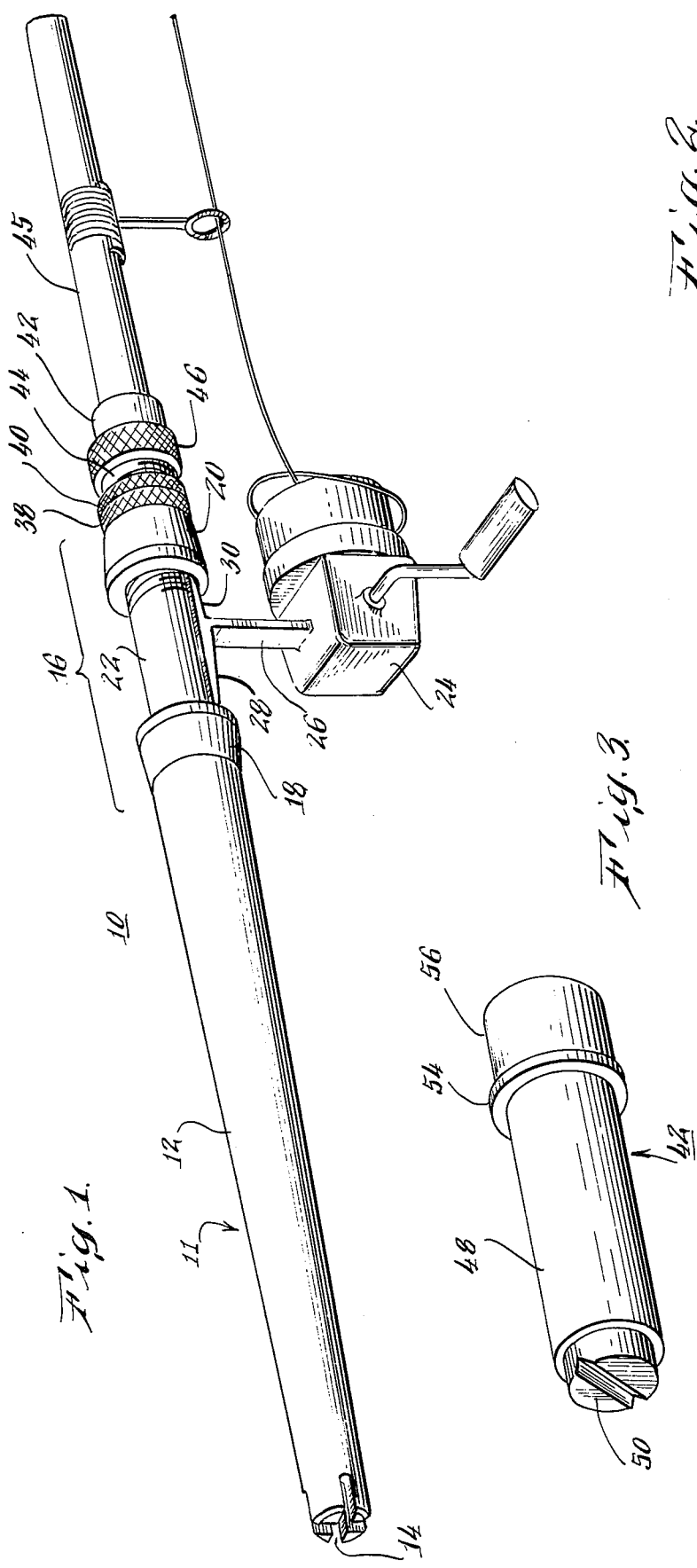
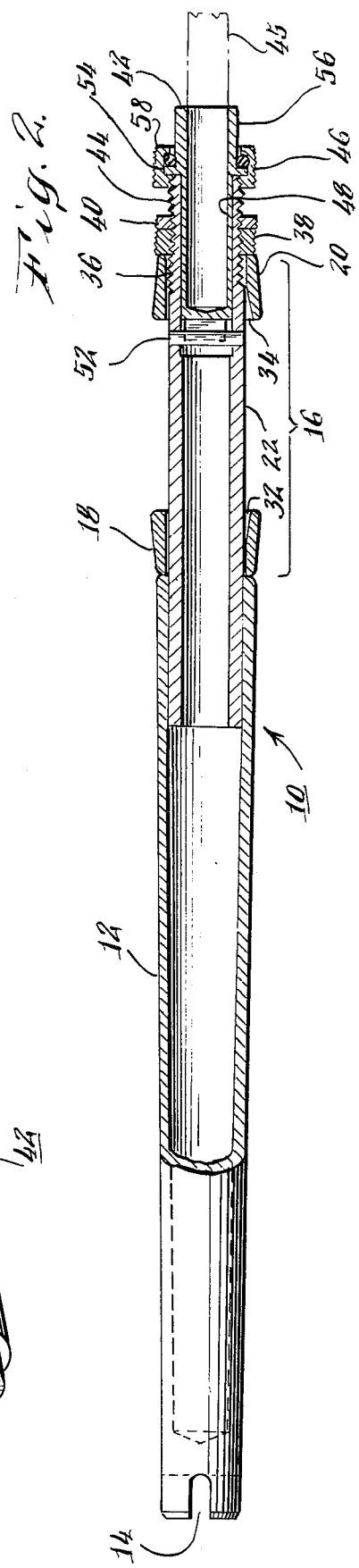

ROD BUTT WITH INTEGRAL REEL SEAT

BACKGROUND OF THE INVENTION

The present invention relates to rod and reel assemblies and particularly to a construction for integrating a rod butt and reel seat.

In conventional reel seat constructions, it is common practice to construct a relatively expensive high quality reel seat and butt of a heavy gauge metallic material and which is adapted to be fitted to a suitable rod tip for guiding the reeled line. In such constructions, however, the rod tips often break or must be varied or interchanged in accordance with different types of fishing conditions and varying weight categories. In such instances, it is necessary for the sport fisherman to carry a varied selection of rods including the unnecessary duplication of the rod butt and reel seat. In addition, any attempt at making interchangeable rod tips utilizing a metal-to-metal contact requires the use of an expensive chrome plated brass or other heavy weighted corrosion resistant material. Although aluminum would be a desirable material, the use of aluminum in a corrosive environment such as sea water results in galling and seizing, thereby jamming the rod tips into the rod butt.

It is therefore the object of the present invention to provide a universal integrated rod butt and reel seat construction which may be employed with a plurality of interchangeable rod tips.

It is another object of the present invention to provide an integrated rod butt and reel seat construction which may employ an aluminum form and be interchangeable with various types of rod butts without difficulties caused by corrosive elements.

BRIEF DESCRIPTION OF THE INVENTION

The foregoing objects are achieved in accordance with the present invention by the provision of an integrated reel seat and rod butt adapted to be fitted interchangeably with a plurality of rod tips by means of a rod tip ferrule. The rod tip ferrule is provided with means adapted to interact with locating means positioned within the rod butt structure, and locates the rod tip in a predetermined relationship with respect to the reel seat. A mount is provided for mounting the rod tip ferrule to the reel seat with a resilient water-tight sealing interposed between the rod tip ferrule and the mount for sealing the mating joints between the ferrule and mount.

The entire unit, including the insertible rod tip ferrule is constructed of the same alloy to prevent electrolysis effects in salt water and, preferably, is constructed entirely of aluminum for lightweight and ease of machining.

Other objects and advantages, as well as further aspects and features of the present invention will become more apparent from the following more detailed description and appended drawings, wherein:

FIG. 1 represents a perspective view of the integrated rod butt and reel seat construction of the present invention;

FIG. 2 is a cross-sectional view along a longitudinal axis of the rod butt and reel seat construction, and FIG. 3 is a perspective view of the insertible rod tip ferrule employed in accordance with the present invention.

DETAILED DESCRIPTION OF THE PREFERRED EMBODIMENT

With reference to the drawings, in accordance with a preferred embodiment of the invention, a fishing rod assembly 10 is provided with a rod butt 11, having a tapered handle 12, including a relatively deeply notched gimbal mount 14. The handle 12 may be exposed corrosive-resistant metal or covered with a cork or other suitable material. Included on the rod butt 11, is an integrally constructed reel seat 16 including a fixed reel seat foot 18 and an adjustable reel seat foot 20. The adjustable reel seat foot is positioned in a linearly adjustable manner along the axial direction of a longitudinally extending supporting cylindrical shaft 22. The support shaft 22 serves as a supporting member for mounting the reel 24 which is provided with a supporting shank 26 and longitudinally extending tang members 28 and 30. The longitudinally extending tang members may be internally shaped, for example, in a concave manner to conform with the cylindrical external surface of the supporting shaft. The longitudinally extending tangs 28 and 30 are each fittable within correspondingly shaped longitudinally extending deformed or depressed segments 32 and 34 respectively formed into the facing portions of the fixed and adjustable reel seats 18 and 20, respectively. These deformed recesses or pockets 32 and 34 are adapted to engage the tangs 38 and 30 of the reel 24 for positioning the reel on the support shaft 22. The adjustable reel seat may be manually positioned along the support shaft 22 for accommodating various longitudinal tang displacements in accordance with the reel size. The support shaft 22 is provided with threaded portions 36 and a reel seat adjusting ring 38 which serves to support the adjustable reel seat foot 20 in accordance with the desired position for engagement with the tang member 30. When the tang 30 is positioned correctly, the reel seat and locking ring 40 is turned against the reel seat adjusting ring 38. This serves to lock the reel seat adjusting ring 38 in position for holding the adjustable reel seat foot 20 locked into position against the tang member 30, thereby holding the reel 24 in place against the support shaft 22. Although it may be possible for the adjustable and fixed reel seat foot roles to be reversed, it is preferred that the fixed reel seat foot 18 be fixed against the handle portion 12 of the rod butt and the adjustable reel seat foot 20, which is made of the slightly larger inner diameter to permit longitudinal adjustment along the axial direction of the rod butt, to be adjustable above the fixed reel seat foot 18 and away from the handle.

Mounted on the farthest end of the rod butt is a rod tip ferrule 42 adapted to accommodate various demountable rod tips 45. The ferrule 42 is insertible into the interior portion of the threaded end 44 of the rod butt. The rod tips are provided with ferrules already mounted thereon, such as by epoxy or other suitable water-resistant bond. It is also possible to supply ferrules in unmounted form to accommodate various sized tips which may be insertible by the user. The rod tip ferrule 42 is held in position by a ferrule locking ring 46 which is mountable on the threaded end portion 44 of the rod butt 12 by virtue of internal threading and thereby adapted to be threadably advanced and retracted longitudinally along the member 44 by suitable rotation thereof along the external threads defined by the threaded end portion 44 of the rod butt. The internal threads of locking ring 46 and the external threads of threaded portion 44 are made with relatively close spacing of, for example, 12 to 20 threads per inch, so as to provide a relatively good seal against corrosive elements. The threaded end portion 44 may be a continuation of the threads 36, continuing along all, or at least a portion, of the support shaft 22. The adjusting ring 38, and locking rings 40 and 46 are each provided with radially outwardly projecting externally serrated or knurled portions for facilitating manual engagement thereof so that each of the rings may conveniently be manually rotatable along the axial direction of the rod butt. It will be noted that while the reel seat 16 of the present invention is illustrated as being coupled in operative association with a spinning reel, the reel seat 16 may be equally adaptable to any other type of fishing reel, such as casting, fly, or other generally employable fishing reel.

Referring to FIG. 2, greater detail of the internal construction of the fishing rod assembly 10 of the present invention is shown. The fixed reel seat foot 18 and the internal supporting shaft 22 are each mounted to the handle portion 12 of the rod butt by means of internally bonded joints. These bonds may be welded or otherwise suitably bonded into place during construction by well known techniques. Alternatively, it may be possible to form the entire structure of 12, 18 and 22 out of a single piece of cast or molded metallic alloy. Preferably, however, the entire rod butt is completely machined from a solid cold rolled bar stock of strong lightweight aircraft alloy such as type 6061 TC aluminum, manufactured by the Aluminum Corporation of America. Other alloys usable for this construction could be magnesium, titanium, or any other corrosion-resistant marine alloy. No dissimilar alloys are employed, and since the rod butt is made of a single piece of bar stock with the handle 12 and reel support 22 overlapping, no grooving is present in this type of construction. The absence of butt joints, which are typical of conventional rod butts, provides increased corrosion resistance and avoids loosening problems that are common on more conventional tackle.

In accordance with the invention, the rod tips 45 are interchangeable by means of the interchangeable rod tip ferrule 42 which is insertible into an opening in the internal end portion 44 of the rod butt shaped to correspond to the mating male end of the ferrule 42. The rod tip ferrule 42 is preferably constructed of the same alloy as the remaining portion of the rod butt. The ferrule 42, shown in greater detail in FIG. 3, is a cylindrically shaped hollow member having an end portion 48 machined or otherwise formed in a manner to conform to the internal opening dimension of the internal portion of the threaded end 44 of the rod butt. At the mating end of the ferrule 42, a depressed slot 50 is formed which is adapted to fit against a locating pin 52. The locating pin 52 is permanently attached to or otherwise formed internally in the central portion of the rod butt. The locating pin 52 is positioned so as to engage the slot 50 of the end 48 of the male ferrule 42, hereby giving the male ferrule 42 a preset orientation with respect to the integrated reel seat. By providing the alignment slot and locating pin, the male ferrule may be interchangeable on the rod butt with a minimum of hand fitting and guide alignment problems.

The male ferrule is provided with a raised ridge or shoulder 54 which is adapted to rest against a correspondingly shaped leading edge of the end portion of the rod butt. The ferrule is secured to the rod butt by means of the internally threaded ferrule locking ring 46 which is applied over the rod tip 45 and the ferrule end portion 45 accommodating the rod tip 45 and is threadably engageable by means of angular rotation onto the externally threaded end portion 44 of the rod butt. To increase the corrosion resistance of the joining portions of the two metallic alloys forming the rod tip ferrule and the internal surface of the end portion of the rod butt, a low friction gasketing or sealing means such as the seal 58 is mounted into the interior portion of the ferrule locking ring 46 beyond the interior threaded portion and positioned to be engageable with the backside portion of the ridge 54 formed on the rod tip ferrule 42. The ridge is preferably formed with flat front and back sides in order to facilitate positive contact with the abutting edge of the rod butt and the seal 58, respectively. The sealing means is fabricated of a composition resistant to moisture and corrosive atmosphere, such as salt, and which will retain its structural integrity after successive compressive axial loads are applied thereto as would occur upon the compressive tightening of the ferrule locking ring 46 against the ridge 54 of the ferrule 42. Examples of such material include such resinous or elastomeric materials as Teflon TFE (polytetrafluoroethylene) or Teflon FEP (poly(tetrafluoroethylene cohexafluoropropylene)), or acetal polymers such as Delrin, nylon, or the like. Teflon and Delrin are trademarks of the DuPont Corporation. Also usable in this regard would be a naturally synthetic rubber or any other type of composition resistant to moisture and salt atmosphere. The seal 58 is preferably in the form of an O-ring, although other shapes may be used in conformance to the shape of the rod butt and ferrule.

The seal 58 allows specifically advantageous use of similar alloys for both the male ferrule 42 and the corresponding mating portion of the rod butt with a close fit high tolerance seal, without the risk of galling and seizing caused by exposure to a corrosive environment such as salt water. In this manner, a relatively snug fit between the shank 48 of the male ferrule 42 and the surface of the internal opening of the end of the rod butt corresponding to the area beneath the threaded portion 44 may be employed. The male ferrule may be designed to be interchangeable with tips in the 6, 12, 20, 30 and 50 lb. and higher classes, and as described above, may be easily and quickly inserted into the rod butt without hand fitting or guide alignment problems. Thus, the rod builder can minimize his inventory whereas the angler can acquire a universal tournament or travelling kit for light and medium tackle fishing using only a single rod butt. The male ferrule may be adapted for either graphite or tubular glass blanks and the rod tips may be easily replaced or added. The locking ring 46 may be provided separately with each rod tip and ferrule assembly for quick insertion of a rod tip onto a rod butt.

The gimbal mount 14 is provided with a deep notch relative to the end diameter of the handle portion 12 of the rod butt 11, thereby improving the holding characteristics relative to rod holders particularly in fast boats and tournament fishing situations. The entire construction may be heavily anodized and provided with various colored metallic depositions to increase the attractiveness of appearance.

Summarizing, an integrated rod butt and reel seat are provided with a construction which allows for interchangeability of rod tips. Since the material is constructed of the same alloy, electrolysis effects in salt water are reduced and, by using a lightweight aluminum or other aircraft type alloy, an extremely efficient and well constructed and lightweight interchangeable rod butt is realized. By providing an insertible ferrule containing various types and sizes of rod tips, the ferrule being precisely machined to fit snugly within the rod butt, hand fitting and guide alignment problems are minimized. Corrosion resistance is increased and the close precision of the ferrule member permitted by the use of a sealing member between a locking ring holding the ferrule in position and the ferrule itself. The seal, which may be if any particular shape or size, provides a low friction gasketing effect allowing quick replacement of the rod tips. The use of the locating pin within the base of the rod butt and a corresponding slot on the ferrule allows the rod tip to be precisely located with respect to the reel seat upon insertion.

It will be apparent that while certain preferred embodiments and constructions have been illustrated, modifications, omissions, variations, deletions, additions and substitutions may all be possible within the principle and concept and scope of the present invention.

What is claimed is:

1. A fishing rod assembly including a rod butt and a reel seat and adapted to be fitted interchangeably to a rod tip, comprising a locating means adapted to locate a rod tip ferrule, said rod tip ferrule including means adapted to interact with said locating means for locating said rod tip ferrule with respect to said reel seat, mounting means for mounting said ferrule to said reel seat, and resilient water-tight sealing means interpositioned between said ferrule and said mounting means for sealing the mating surfaces between said ferrule and said reel seat, said rod butt, reel seat and ferrule all constructed of the same alloy.

2. The assembly of claim 1 wherein said alloy is aluminum.

3. The assembly of claim 1 wherein said ferrule is shaped with an elongated shank for insertion into said rod butt and including a raised ridge for abutting said rod butt.

4. The assembly of claim 3 wherein said mounting means includes said sealing means mounted thereon and adapted to rest upon the backside of said raised ridge.

5. A fishing rod assembly including a rod butt and integrated reel seat and adapted to be fitted interchangeably with demountable rod tips fitted into male ferrules, comprising a handle portion overlappingly mounted and bonded to a reel seat support shaft, a locating means provided internally to said reel seat support shaft, said reel seat support shaft being provided with an external thread over at least a portion thereof and continuing to the end thereof, a fixed reel support mounted at the handle end of said support shaft, a movable reel support provided in operative relation to said fixed reel support on said support shaft, linearly adjustable locking means for fixing said movable reel support in a desired position for supporting a reel, said locating means adapted to locate a rod tip ferrule, said rod tip ferrule including means adapted to interact with said locating means for locating said rod tip ferrule with respect to said reel seat, mounting means for mounting said ferrule to said reel seat, and resilient water-tight sealing means interpositioned between said ferrule and said mounting means for sealing the mating surfaces between said ferrule and said reel seat, said rod butt, reel seat and ferrule all constructed of the same alloy.

6. The assembly of claim 5 wherein said alloy is aluminum.

7. The assembly of claim 5 wherein said ferrule is shaped with an elongated shank for insertion into said rod butt and including a raised ridge for abutting said rod butt.

8. The assembly of claim 7 wherein said mounting means incudes said sealing means mounted thereon and adapted to rest upon the backside of said raised ridge.

* * * * *